United States Patent [19]
Economy et al.

[11] 3,831,760
[45] Aug. 27, 1974

[54] ACTIVATED CARBON CHEMICAL ADSORPTION ASSEMBLY

[75] Inventors: James Economy, Eggertsville; Ruey Y. Lin, Williamsville, both of N.Y.

[73] Assignee: The Carborundum Company, Niagara Falls, N.Y.

[22] Filed: June 28, 1972

[21] Appl. No.: 266,964

[52] U.S. Cl.......... 210/242, 210/DIG. 21, 210/502, 252/421
[51] Int. Cl............................................ E02b 15/04
[58] Field of Search .......... 210/36, 39, 40, 83, 242, 210/DIG. 21; 61/1 F; 252/421; 423/447; 112/420; 51/140 R

[56] References Cited
UNITED STATES PATENTS

| | | | |
|---|---|---|---|
| 1,397,892 | 11/1921 | Jones | 210/DIG. 21 |
| 3,256,206 | 6/1966 | Doying | 252/421 |
| 3,274,104 | 9/1966 | Hamilton | 210/39 |
| 3,405,674 | 10/1968 | Coates et al. | 112/420 |
| 3,537,587 | 11/1970 | Kain | 210/DIG. 21 |
| 3,650,102 | 3/1972 | Economy et al. | 57/140 R |
| 3,702,657 | 11/1972 | Cunningham et al. | 61/1 F |

FOREIGN PATENTS OR APPLICATIONS

| | | | |
|---|---|---|---|
| 1,525,310 | 9/1968 | France | 210/DIG. 21 |
| 676,701 | 12/1963 | Canada | 252/421 |

*Primary Examiner*—Theodore A. Granger
*Attorney, Agent, or Firm*—David E. Dougherty; Raymond W. Green

[57] ABSTRACT

Activated carbon textile is provided with a buoyant member (floating support) and a sinking weight, for use in controlling chemical spillage on commercial waterways such as rivers, lakes, oceans and other bodies of water. According to various embodiments of the invention, the activated carbon chemical adsorption assembly can be constructed in configurations which are essentially one dimensional, two dimensional, or three dimensional, with various degrees of dimensional stability. Chemical spillage is preferably controlled by the use of a combination of various embodiments, which differ as to convenience and effectiveness, with the more convenient configurations being somewhat less effective, and the more effective configurations being somewhat less convenient to use.

20 Claims, 12 Drawing Figures

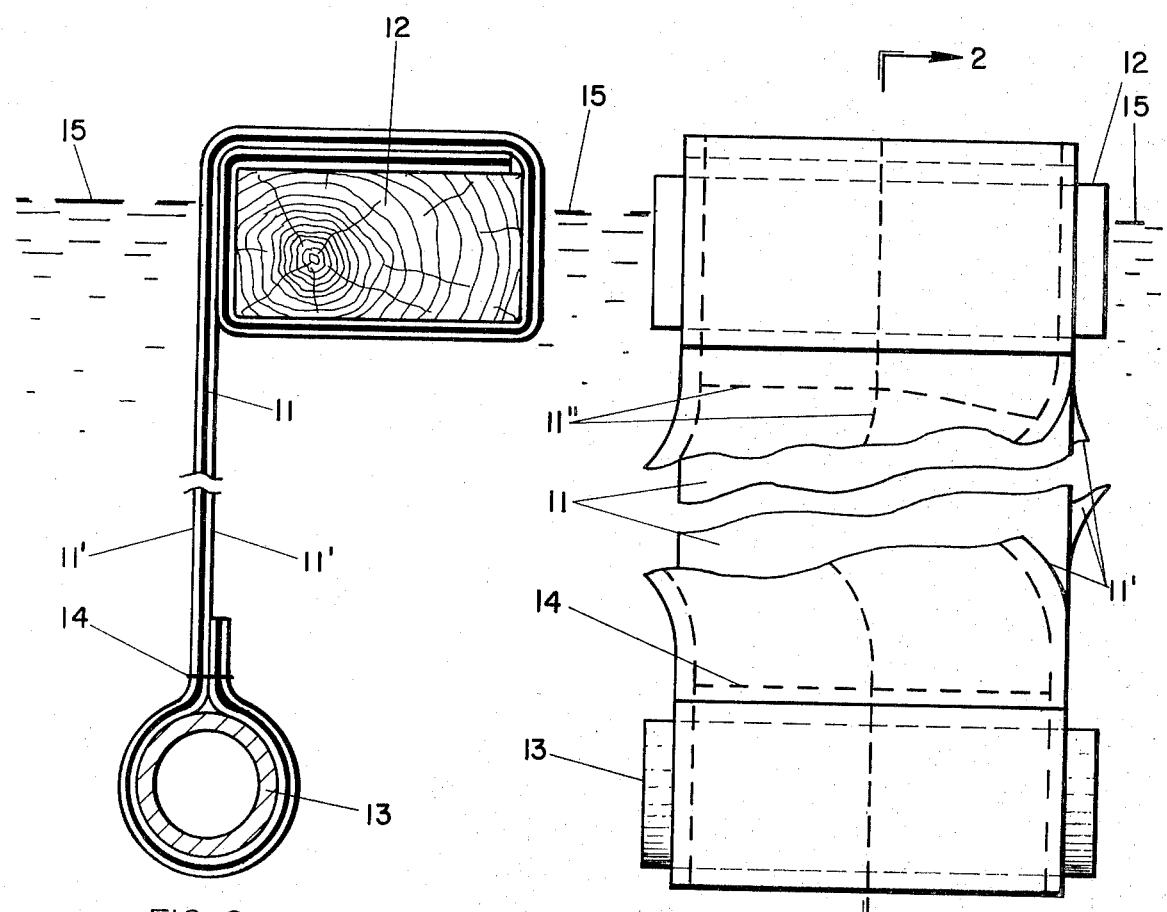
FIG. 2
FIG. 1
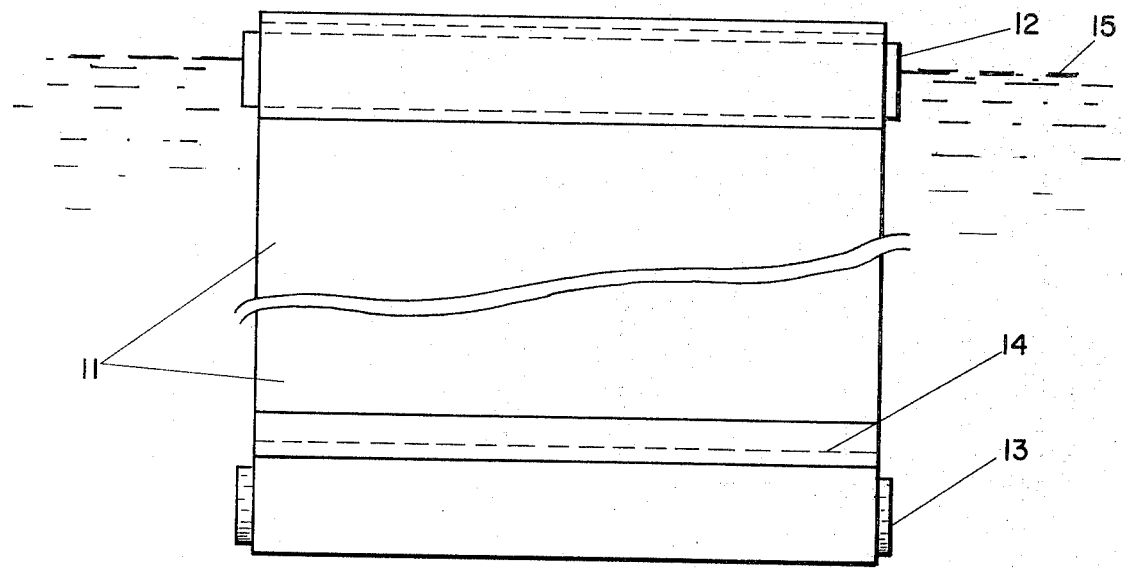
FIG. 6

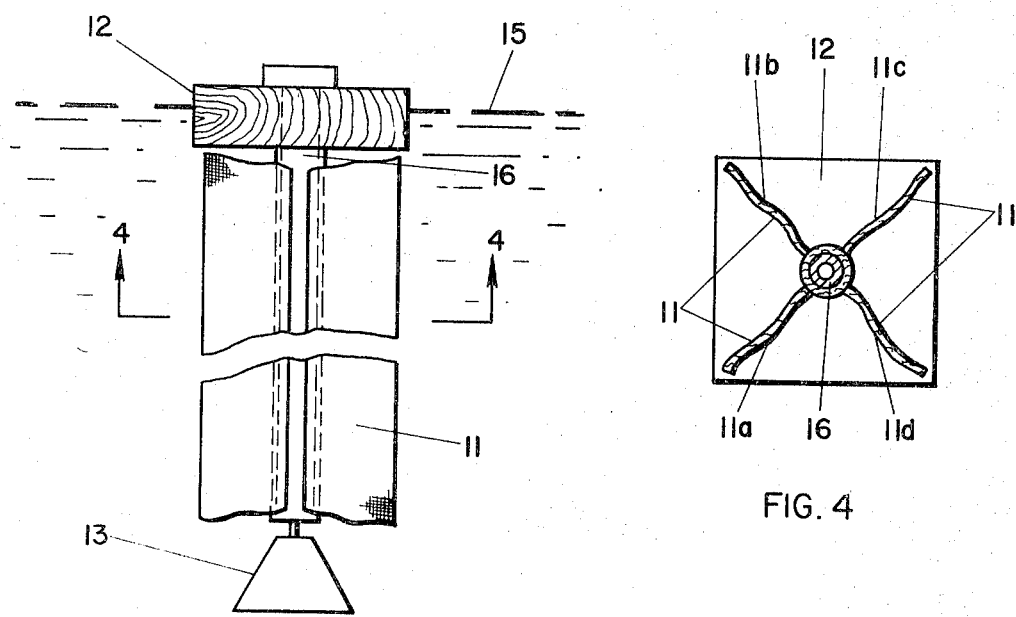
FIG. 3
FIG. 4
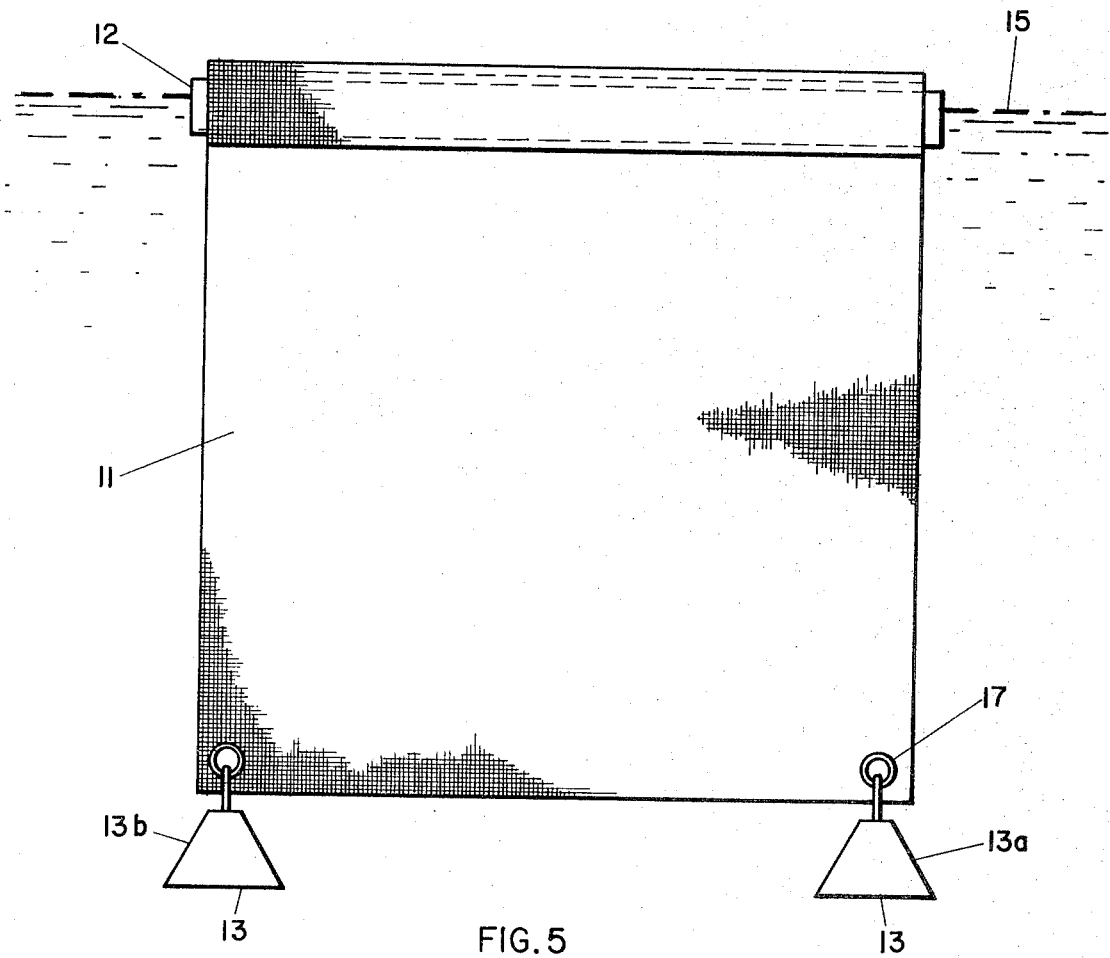
FIG. 5

3,831,760

ACTIVATED CARBON CHEMICAL ADSORPTION ASSEMBLY

BACKGROUND OF THE INVENTION

As science and industry become further advanced, there is a greater and greater tendency to produce large quantities of various chemical raw materials. As commerce, particularly international commerce, becomes more advanced, there is likewise an increasing tendency to transport large quantities of these industrial chemicals over commercial waterways. Liquid and gaseous chemicals are most conveniently shipped by tanker. As the volume of fluids shipped in interstate and international commerce increases, there is a tendency to use larger and larger tankers to transport these fluids, chiefly crude petroleum, but also highly refined chemicals such as phenol and aqueous solutions of a number of gaseous chemicals such as phosgene, sulfur dioxide, chlorine, hydrogen cyanide, hydrogen sulfide, formaldehyde, acetaldehyde, etc. As the number and size of shipments of such materials in tankers increases, it becomes more probable, and perhaps even inevitable, that from time to time accidents occur, and large quantities of chemicals are accidentally released in commercial waterways. The release of large amounts of crude oil is a bad enough problem, which frequently causes a great deal of commotion and trauma in attempting to control the spillage, but the crude oil which is spilled in nonetheless relatively contained, since it is both lighter than and insoluble in water, so that it remains in a relatively defined location where it can be retained until recovered or otherwise disposed of, for example by burning.

Many industrial chemicals which are in increasing quantities being shipped on commercial waterways such as rivers, lakes and oceans do not have this combination of physical properties, however. For example, phenol and aqueous solutions of various gaseous chemicals are prone to dissolve in the body of water upon which the tanker which carried them was travelling, if an unfortunate accident and chemical spillage should occur. Because many of these chemicals are highly toxic as well as water soluble, and/or denser then water, their recovery from the place where the spillage occurred is an important ecological task and must be accomplished rapidly if at all.

The prompt recovery of large quantities of accidentally spilled toxic chemicals from oceans, lakes, and other channels of aqueous commerce is of course an ecological concern of potentially substantial proportions. Another problem of perhaps greater proportion is the removal of chemicals discharged by industry into waterways, which are accumulating in lakes in alarming quantities. While attempts are being made to limit the amount of such discharges by regulatory statutes, these statutes cannot undue past harm, frequently allow some amount of chemical discharge considered permissible, and are also violated with distressing frequency. Chemical discharge can therefore accumulate in lakes and other contained waterways, to the point where it must be removed.

It is, therefore, an object of the present invention to provide devices for the adsorption of various chemicals which may become discharged into or spilled on commercial waterways. In spite of the availability of activated carbon fibers (see for example U.S. Pat. No. 3,053,775), the use of such activated carbon fibers for use in controlling chemical spillage on commercial waterways is not believed to have been previously proposed.

SUMMARY OF THE INVENTION

According to the present invention, there is provided an activated carbon chemical adsorption assembly, comprising (1) a longitudinal buoyant member, (2) a flexible fabric of activated carbon textile with one edge connected to said member to be floatingly supported thereby. And (3) weight (sinking) means connected to an opposite edge of the activated carbon textile to maintain said edge spaced apart from said buoyant member. The activated carbon textile can be affixed to the longitudinal buoyant member, and the weight means connected to the activated carbon textile, either directly or by means of an intermediary such as a dimensional stabilizing support. According to various embodiments of the invention, the activated carbon chemical adsorption assembly can be essentially one dimensional, two dimensional, or three dimensional, and can be provided with varying degrees of dimensional stability.

BRIEF DESCRIPTION OF THE DRAWINGS

FIG. 1 is an illustration of one embodiment of the present invention, wherein the length of the activated carbon textile is substantially greater than the width of the activated carbon textile.

FIG. 2 is a second view in cross section of the embodiment of the device illustrated in FIG. 1, taken along line 2—2 of FIG. 1.

FIG. 3 illustrates another embodiment of the present invention, comprising in addition a dimensional stabilizing support connecting the buoyant member to the weight means, the activated carbon textile being affixed to the buoyant member and the weight means by means of the dimensional stabilizing support.

FIG. 4 is an additional view of the embodiment illustrated in FIG. 3, taken along line 4—4 of FIG. 3.

FIG. 5 illustrates another embodiment of the present invention, wherein the activated carbon textile comprises a single sheet, the ratio of the length of the activated carbon textile to the width of the activated carbon textile being within the range from about 3:1 to about 1:3; the buoyant member being rigid and providing dimensional stability to one side of the single sheet; and the weight means comprising a plurality of individual weights.

FIG. 6 illustrates another embodiment of the present invention, similar to the embodiment illustrated in FIG. 5 except that the weight means is a single rigid weight which provides dimensional stability to a second side of the single sheet of activated carbon textile, opposite the side connected to the buoyant member.

DETAILED DESCRIPTION

Figure 8:
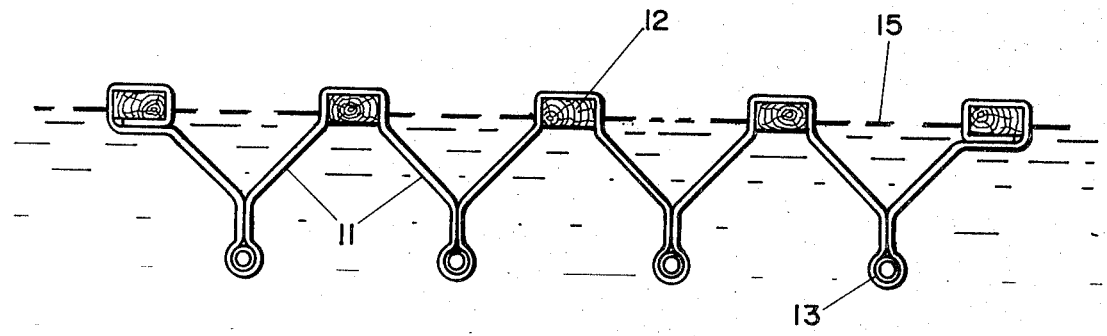
FIGS. 7 and 8, FIG. 8 being a sectional view taken along line 8—8 of FIG. 7, illustrate a further embodiment of the present invention wherein the activated carbon textile comprises (1) a plurality of buoyant portions, each buoyant portion being provided with a rigid buoyant support providing a first dimension of dimensional stability to the activated carbon chemical adsorption assembly; and (2) a plurality of weighted portions, each weighted portion being provided with at least one weight; the plurality of rigid buoyant supports and the plurality of weights being alternately connected in series by the activated carbon textile, but unconnected except by the activated carbon textile.

As used herein, the terms, "buoyant" or "floating" and "weighted" or "sinking" indicate density relative to water in commercial waterways, i.e., about 1.0 g/cu. cm. In other words, an object is deemed to be a "buoyant" or "floating" object if it has a density somewhat less than 1.0 g/cu. cm., and a "weighted" or "sinking" object if it has a density somewhat greater than 1.0 g/cu. cm. Examples of floating objects are pieces of wood and hollow plastic articles which have been made watertight, with wood being usually preferred. Examples of sinking means are metallic pipes and plates, rocks, and pieces of cement and the like, with metallic weights being usually preferred.

"Activated carbon textile" is activated carbon in fiber form, i.e., carbon in fiber form which has been intentionally treated by some process to increase its surface area and therefore its ability to adsorb chemical materials which come into contact with the activated carbon textile. Preferably the surface area of the activated carbon is at least about 300 $m^2/g$ (square meters per gram), but even higher surface areas, such as activated carbon in which the surface area ranges from about 1000 to about 3000 $m^2/g$, are even more preferred.

The form of activated carbon textile which can be used in the present invention include layers of woven carbon cloth, carbon felt, resin bonded carbon batting, and loose staple carbon fibers. The preferred forms are carbon cloth, and carbon felt. In the case of loose staple carbon fibers, and even carbon felt and woven carbon cloth which does not have sufficient strength to hold up under the stresses and strains of weather when the activated carbon chemical adsorption assembly is placed in an aqueous waterway, it is preferred to use a quilted activated carbon textile, in accordance with copending commonly assigned U.S. Pat. application Ser. No. 237,836, filed Mar. 24, 1972 by J. Economy and R. Y. Lin, the disclosure of which is incorporated by reference. Such an activated carbon textile is part of a quilted fabric containing high surface area carbon fibers, comprising in combination (1) at least one layer of flexible carbon fibers having a surface area of at least about 300 $m^2/g$; (2) a pair of outer layers of reinforcing fabric, positioned on each side of the layer of flexible carbon fibers; and (3) a network of quilting stitching, uniting the central layer of flexible carbon fibers and the outer layers of reinforcing fabric into an integral quilted fabric.

The preferred method for producing carbon fibers for use in the present invention, regardless of the particular form of fibers, comprises the steps of (1) heating an infusible, cured, phenolformaldehyde novolac novoloid fiber in air from about room temperature up to an intermediate temperature in the range of from about 250°C to about 450°C, at a rate of temperature rise of from about 50°C/hour to about 200°C/hour, and (2) further heating the fiber in a nonoxidizing atmosphere from said intermediate temperature to a final temperature in the range of from about 700°C to about 900°C at a rate of temperature rise of from about 50°C/hour to about 200°C/hour.

Further details of this method of producing carbon fibers and preferred features of the method of production are set forth in commonly assigned, copending U.S. Pat. application Ser. No. 182,865, filed Sept. 22, 1971, by J. Economy and R. Y. Lin, the disclosure of which is incorporated herein by reference. The starting material, namely the infusible cured (cross-linked) phenolformaldehyde novolac fiber, is produced as described in U.S. Pat. No. 3,650,102, issued Mar. 21, 1972, to J. Economy and R. Clark, assignors to The Carborundum Company of Niagara Falls, New York. The U.S. Federal Trade Commission assigned the symbol "CA-0001" for temporary use and the permanent generic name "novoloid" for use after Feb. 15, 1974, in describing the cross-linked novolac fiber, and it is sold by The Carborundum Company of Niagara Falls, New York, as Kynol brand novoloid fiber.

Other methods of forming activated carbon fibers for use in the present invention can also be used. For example, carbon fibers made from pitch or mixtures of pitch and novolac can be activated by heating in steam (e.g., 20–30 minutes at 900°C for carbon fibers made from pitch, or as low as 5 minutes at 900°C for carbon fibers made from combinations of pitch and novolac), and such fibers can also be used in the present invention. Other flexible carbon fibers having high surface area, if available, can also be used.

The invention will now be described by means of several specific examples, as illustrated in the drawings.

EXAMPLE 1

FIGS. 1 and 2, FIG. 2 being a sectional view along line 2—2 of FIG. 1, illustrate one embodiment of the present invention, which is essentially one dimensional, with no degree of dimensional stabilization. Activated carbon textile 11 is the central layer of a quilted fabric made in accordance with the teachings of application Ser. No. 237,836, filed Mar. 24, 1972, and comprises central layer 11 of carbon cloth containing flexible carbon fibers having a surface area of at least about 300 $m^2/g$, a pair of outer layers of reinforcing fabric 11' positioned on each side of the central layer of the woven carbon cloth, and a network of quilting stitching 11" uniting the central layer 11 of flexible carbon cloth and the outer layers of reinforcing fabric 11' into an integral quilted fabric. Activated carbon textile 11 is affixed on the one hand to floating support means 12, which in this case is a block of wood; and on the other hand to sinking means 13, which in this case is a piece of steel pipe affixed to activated carbon textile 11 by attachment stitching 14. Waterline 15 shows the orientation of the assembly in use.

The embodiment of this example is essentially one dimensional, since the length of the activated carbon textile 11 is substantially greater than the width of activated carbon textile 11 (preferably at least 10 times as great). The device has no dimensional stability, since there is no prohibition against the distance between floating support means 12 and sinking means 13 varying from 0 up to the length (less wrappings around support means 12 and sinking means 13) of activated carbon textile 11. This embodiment of the invention therefore has the advantage that it can be stored in a compact convenient location, and quickly dispatched into a commercial waterway when needed to quickly adsorb chemicals which may have been spilled in the waterway. Furthermore, lacking dimensional stability activated carbon textile 11 can be buffeted to and fro by the natural movement of the water in the waterway, such as is produced by waves, weather, normal movement of a river, and the like. The surface of activated carbon textile 11 is therefore exposable to a large quantity of water into which has been spilled a chemical, so that the chemical can be quickly adsorbed onto the surface of activated carbon textile 11. Devices in accordance with this example can readily be used in multitudinous quantities in order to control and adsorb large quantities of spilled chemicals, for example by being dropped into the water from the air.

EXAMPLE 2

A second embodiment of the present invention is illustrated in FIGS. 3 and 4, FIG. 4 being a sectional view taken along line 4—4 of FIG. 3. Like the device of Example 1, this device is essentially one dimensional since the length of activated carbon textile 11 is substantially greater than the width of the activated carbon textile 11. The embodiment of the invention illustrated herein is, however, dimensionally stabilized in one direction, since the embodiment comprises in addition a dimensional stabilizing support 16 connecting the floating support means 12 to the sinking means 13, the activated carbon textile 11 being affixed to the floating support means 12 and the sinking means 13 by means of the dimensional stabilizing support 16. Support 16 can be any convenient water-resistant material, such as a hollow plastic pipe, metal tube, or other material which will withstand the buffeting to and fro which can occur when the activated carbon chemical adsorption assembly is placed in a waterway to adsorb chemical spillage. The orientation of the device in use is again shown by waterline 15.

The device of this example has advantages and disadvantages as compared to the device of Example 1. For example, the use of dimensional stabilizing support 16 allows the use of a weaker activated carbon textile 11, for example felt or unquilted cloth, since activated carbon textile 11 is now no longer required to directly connect floating support means 12 and sinking means 13. Furthermore, activated carbon textile 11 can comprise a plurality of wings 11a–11d, as best illustrated in FIG. 4. Also, the device of FIGS. 3 and 4 is not subject to becoming bunched up in a compact mass when thrown into an extremely choppy water situation, which is possible with the device of FIGS. 1 and 2, particularly if the weight of sinking means 13 is somewhat light. On the other hand, the device of FIGS. 3 and 4 is subject to the disadvantages, as compared to the device of FIGS. 1 and 2, that it is more complicated to assemble, and it cannot be stored as compactly as the device of FIGS. 1 and 2.

EXAMPLE 3

According to a further embodiment of the present invention, as illustrated in FIG. 5, the activated carbon chemical adsorption assembly can be two dimensional, and partially stabilized in one direction. By "two dimensional", is meant that the length and width of the activated carbon textile 11 are similar in their dimensions, the ratio of these distances preferably being within the range of from about 3:1 to about 1:3. Also, in contrast to the embodiments illustrated in FIGS. 7–12, the embodiment illustrated in FIG. 5 comprises a single sheet of activated carbon textile 11. In this example unquilted woven activated carbon cloth is used. This use is made feasible because of the greater width of the activated carbon textile 11.

The partial dimensional stability of the embodiment of the present invention is accomplished for one side of the single sheet of activated carbon textile 11 which is affixed to the floating support means 12, by providing rigidity to floating support means 12, so that when the activated carbon chemical adsorption assembly is placed within a waterway, the choppy waters and other atmospheric conditions which would tend to cause activated carbon textile 11 to become compressed into a single ball are frustrated by the rigidity of floating support means 12.

A further feature of the embodiment of FIG. 5 is that the sinking means comprises a plurality of individual weights 13a and 13b, which can be affixed to activated carbon textile 11 in various locations, advisedly with the use of reinforcements 17. Waterline 15 shows the orientation of the embodiment of this example in use to adsorb chemical spillage in a waterway.

EXAMPLE 4

A further embodiment of the present invention is illustrated in FIG. 6, which is an essentially two dimensional form of activated carbon chemical adsorption assembly, with full stabilization in one direction. This embodiment comprises rigid floating support means 12, unquilted activated carbon textile 11 affixed to the floating support means 12, and rigid sinking means 13 affixed to activated carbon textile 11. Full stabilization is obtained by using a sinking means 13 which is a single rigid weight and provides dimensional stability to a second side of the single sheet of activated carbon textile 11 opposite the first rigid side, which is affixed to the rigid floating support means 12. The orientation of this embodiment in use is again illustrated by waterline 15. Except for relative size and the use of non-quilted textile 11, the embodiment of this example is quite similar to the embodiment of Example 1.

EXAMPLE 5

Figure 7:
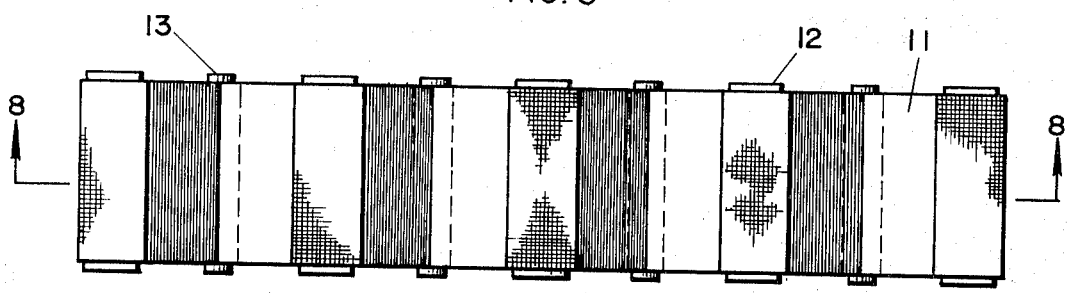

According to this and the following examples, there are provided embodiments of the invention which are three dimensional with various degrees of dimensional stability. According to the embodiment illustrated in FIGS. 7 and 8, FIG. 8 being a sectional view taken along line 8—8 of FIG. 7, a three dimensional body is provided with a single degree of dimensional stability for both the floating support means 12 and sinking means 13, which are alternately connected in series by activated carbon textile 11, but otherwise unconnected. Again, the orientation of the embodiment in use is shown by waterline 15. The device of FIGS. 7 and 8 is essentially a connected series of devices as illustrated in FIG. 6, connected floating-portion-to-floating-portion and sinking-portion-to-sinking-portion, with pairs of adjacent floating support means 12 and sinking means 13 being replaced by a common floating support means 12 or sinking means 13, respectively. The embodiment of this example has the advantage that one large adsorption assembly can be placed in an area in which chemicals have been spilled and utilized to recover chemicals from a large portion of the area. This is a distinct handling advantage, since not as many activated carbon chemical adsorption assemblies need be used to control the particular spillage involved. The embodiment of this example also has the advantage that while dimensional stability is obtained in one direction at both the floating level and the sinking level, the assembly is free to move to and fro with changes in the water due to waves, weather and the like. This means that the various portions of activated carbon textile 11 can be free to move through many areas of the waterway in which the chemicals are spilled, and therefore recover chemicals from a larger area than would otherwise be possible.

EXAMPLE 6

The embodiment of this example is not specifically illustrated but is quite similar to that of FIGS. 7 and 8. Instead of employing a series of two dimensional embodiments similar to that illustrated in FIG. 6, a series of two dimensional embodiments similar to that illustrated in FIG. 5 is used. The sinking means 13 as illustrated in FIGS. 7 and 8 are thus each replaced each with a pair of sinking weights such as 13a and 13b as illustrated in FIG. 5. This replacement allows even greater flexibility of the device, and greater amounts of freedom to adsorb greater quantities of spilled chemicals.

EXAMPLE 7

Figure 10:
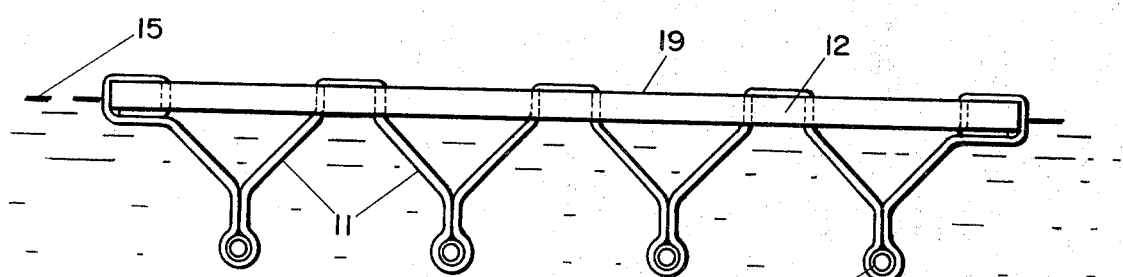
FIGS. 9 and 10 illustrate an additional embodiment of the present invention, FIG. 10 being a sectional view taken along line 10—10 of FIG. 9, similar to the embodiment illustrated in FIGS. 7 and 8, except that the plurality of buoyant supports is rigidly connected by buoyant means providing a second dimension of dimensional stability to the activated carbon chemical adsorption assembly.
Figure 9:
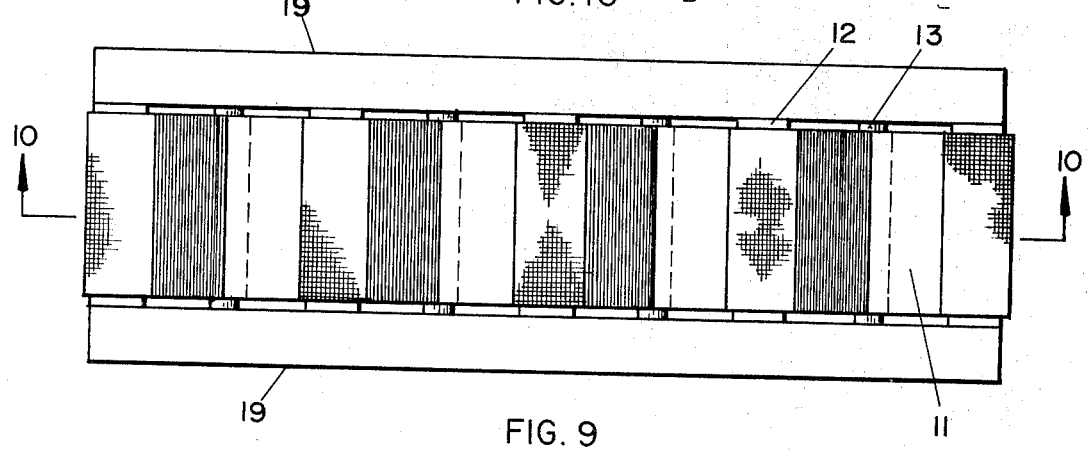

Another embodiment of this invention is illustrated in FIGS. 9 and 10, FIG. 10 being a sectional view taken along line 10—10 of FIG. 9. Like the embodiment of Example 5, this embodiment comprises floating support means 12 and sinking means 13, which are alternately connected in series by activated carbon textile 11; and the orientation in use is shown by waterline 15. This embodiment differs however, in having a pair of floating means 19 which rigidly connect floating supports 12 and provide a second dimension of dimensional stability to the activated carbon chemical adsorption assembly.

The devices of Examples 5 and 6, although having one direction of dimensional stability at either the floating level or both the floating level and the sinking level, and dimensional nonstability in the perpendicular horizontal direction, have the advantage of greater flexibility and greater potential ability to adsorb spilled chemicals; but this very flexibility can be a disadvantage in some particular situations, i.e., where the water is extremely rough due to high waves or excessive weather conditions, or the like, so that additional dimensional stability is provided in this embodiment by floating means 19. While the device of FIGS. 9 and 10 as illustrated has the disadvantage that it is cumbersome and somewhat difficult to store, it need not be stored in that configuration but can be constructed by providing floating means 19 with attachment means (not shown) for quick attachment to floating support means 12 of the embodiment of Example 5 as illustrated in FIGS. 7 and 8, so that a single activated carbon chemical adsorption assembly can be used either according to the mode illustrated in FIGS. 7 and 8 or in the mode illustrated in FIGS. 9 and 10, depending on such factors as the amount of waves present and the weather conditions at the time.

EXAMPLE 8

Figure 11:
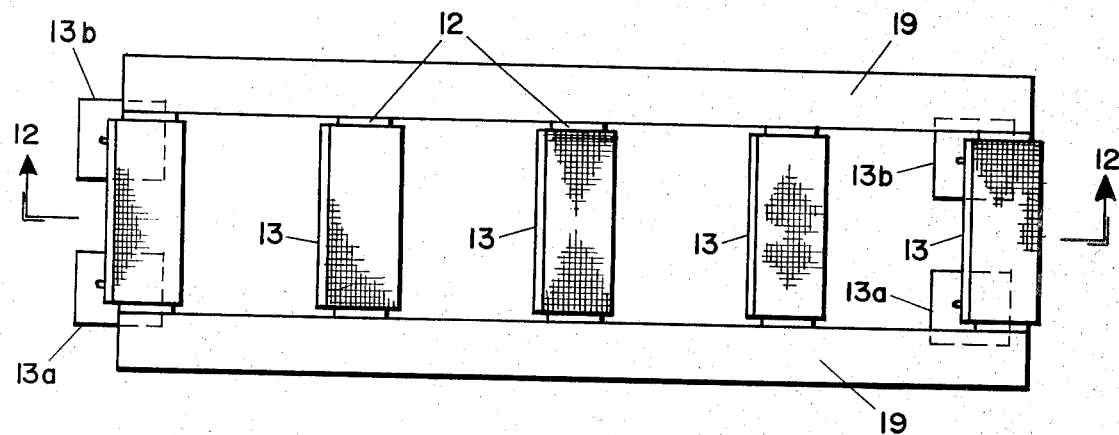
FIGS. 11 and 12 illustrate a further embodiment of the present invention, FIG. 12 being a sectional view taken along line 12—12 of FIG. 11, similar to the embodiment illustrated in FIGS. 9 and 10, except that the buoyant supports and weights are paired and connected to each other by individual portions of activated carbon textile, the individual portions of activated carbon textile being unconnected except by the buoyant means rigidly connecting the floating supports and providing dimensional stability to the activated carbon chemical adsorption assembly.
Figure 12:
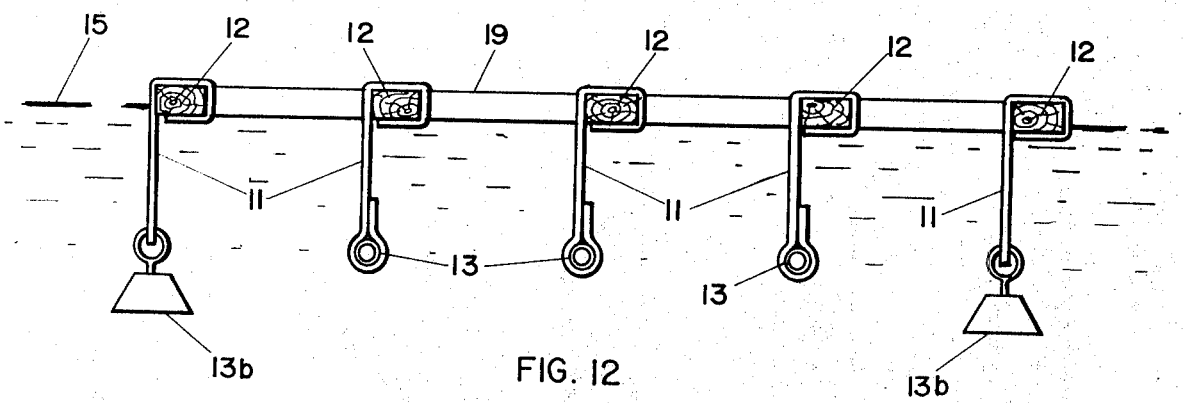

A variation on the embodiment illustrated in Example 7 is illustrated in FIGS. 11 and 12, FIG. 12 being a sectional view taken along line 12—12 of FIG. 11. In the embodiment of this example, a plurality of sheets of activated carbon textile 11 are each individually provided with floating support means 12 and sinking means which can be either a single rigid sinking means 13 or a pair of separate weights 13a and 13b. The expedient of using a combination of types of sinking means is of course not limited to the present example. According to this embodiment, floating supports 12 are rigidly connected by floating means 19, thereby providing dimensional stability to the activated carbon chemical adsorption assembly. The floating supports 12 and sinking means 13 or 13a are paired and connected to each other by individual portions of activated carbon textile 11, the individual portions of activated carbon textile being in this embodiment unconnected except by the floating means which rigidly connect the floating supports 12 and provide dimensional stability to the activated carbon chemical adsorption assembly. Waterline 15 shows the orientation of this embodiment in use.

Regardless of the particular embodiment or embodiments described above (or other variations which will be obvious to those skilled in the art) which are constructed in accordance with the present invention and used to control discharged or spilled chemicals, the activated carbon chemical adsorption assemblies are distributed on the waterway to adsorb chemicals, and afterwards are collected for disposal or recovery of the chemicals, the activated carbon chemical adsorption assembly, or both, depending on the relative economic merit of recovery as opposed to disposal.

The effectiveness of activated carbon in adsorbing chemicals from water in a natural environment is difficult to measure accurately, but is illustrated in the following data from controlled experiments. In the first test, the ability of activated carbon textile to adsorb phenol in a given amount of time was tested by immersing a portion of carbon fabric in a solution of 2 g/l. of phenol in water. The activated carbon fabric had an adsorption capacity ranging from 131.5 to 215.5 mg. phenol adsorbed per gram of carbon fabric. This carbon fabric had a surface area of about 620 m$^2$/gram. Details of this test are set out in Table 1.

Table 1

Immersion Time and Phenol Adsorption Capacity

| Sample | Wt. of Carbon Fabric (g) | Immersion Time (min) | Amt. of Phenol Adsorbed (mg) | Adsorption Capacity (mg/g) |
|---|---|---|---|---|
| 1 | 0.3543 | 1 | 46.6 | 131.5 |
| 2 | 0.3711 | 5 | 64.6 | 174.1 |
| 3 | 0.3750 | 10 | 62.1 | 165.6 |
| 4 | 0.4155 | 30 | 73.2 | 176.2 |
| 5 | 0.3959 | 60 | 85.3 | 215.5 |

In a second test, the ability of activated carbon textile to adsorb iodine was studied. The results are summarized in Table 2.

Table 2

Rate of $I_2$ Adsorption

| Sample | Wt. of Cloth Used | Contact Time (min) | Iodine Removal (g) | Adsorption Capacity (mg/g) |
|---|---|---|---|---|
| 6 | 0.3577 | 1 | 105.5 | 294.9 |
| 7 | 0.3674 | 5 | 241.0 | 655.9 |
| 8 | 0.2891 | 10 | 277.1 | 958.7 |
| 9 | 0.3358 | 30 | 311.0 | 927.9 |
| 10 | 0.3156 | 60 | 291.9 | 924.9 |

Iodine concentration was 1.1720 g/l.; the surface area of the cloth was 750 m²/g.

Additional tests confirmed a high degree of effectiveness in adsorbing a variety of chemicals from water, including acetaldehyde, formaldehyde, hydrogen cyanide, hydrogen sulfide, sulfur dioxide, and phosgene.

The activated carbon textile of the above tests was in all cases made from an infusible, cured (cross-linked) phenol-formaldehyde novolac (novoloid) fiber, produced in accordance with the teachings of U.S. Pat. No. 3,650,102. This fiber was then converted to an activated carbon fiber in accordance with the teachings of application Ser. No. 182,865, namely by heating the infusible cured (cross-linked) phenol-formaldehyde novolac (novoloid) fiber in air from about room temperature up to an intermediate temperature in the range of from about 250°C to about 450°C, at a rate of temperature rise of from about 50°C/hour to about 200°C/hour, and further heating the fiber in a nonoxidizing atmosphere from said intermediate temperature to a final temperature in the range of from about 700°C to about 900°C at a rate of temperature rise of from about 50°C/hour to about 200°C/hour.

We claim:

1. An activated carbon chemical adsorption assembly comprising
   1. a longitudinal buoyant member,
   2. a flexible fabric of activated carbon textile with one edge connected to said member to be floatingly supported thereby, and
   3. weight means connected to an opposite edge of the activated carbon textile, to maintain said edge spaced apart from said buoyant member.

2. The activated carbon chemical adsorption assembly of claim 1, wherein the length of the activated carbon textile is substantially greater than the width of the activated carbon textile.

3. The activated carbon chemical adsorption assembly of claim 1, comprising in addition a dimensional stabilizing support connecting the longitudinal buoyant member to the weight means, the activated carbon textile being affixed to the longitudinal buoyant member and the weight means by means of the dimensional stabilizing support.

4. The activated carbon chemical adsorption assembly of claim 3, wherein the activated carbon textile is carbon felt.

5. The activated carbon chemical adsorption assembly of claim 1, wherein the activated carbon textile is woven carbon cloth.

6. The activated carbon chemical adsorption assembly of claim 1, wherein the activated carbon textile is part of a quilted fabric containing high surface area carbon fibers, the quilted fabric comprising in combination
   1. at least one central layer of flexible carbon fibers having a surface area of at least about 300 m²/g;
   2. a pair of outer layers of reinforcing fabric, positioned on each side of the layer of flexible carbon fibers; and
   3. a network of quilting stitching, uniting the central layer of flexible carbon fibers and the outer layers of reinforcing fabric into an integral quilted fabric.

7. The activated carbon chemical adsorption assembly of claim 1, wherein the activated carbon textile comprises a single sheet, and the ratio of the length of the activated carbon textile to the width of the activated carbon textile is within the range of from about 3:1 to about 1:3.

8. The activated carbon chemical adsorption assembly of claim 7, wherein the longitudinal buoyant member is rigid and provides a dimensional stability to one side of the single sheet of activated carbon textile which is affixed to the longitudinal buoyant member.

9. The activated carbon chemical adsorption assembly of claim 8, wherein the weight means comprises a plurality of individual weights.

10. The activated carbon chemical adsorption assembly of claim 8, wherein the weight means is a single rigid weight which provides dimensional stability to a second side of the single sheet of activated carbon textile, opposite the side affixed to the longitudinal buoyant member.

11. The activated carbon chemical adsorption assembly of claim 1, wherein the activated carbon textile comprises
   1. a plurality of buoyant portions, each buoyant portion being provided with a rigid buoyant support providing a first dimension of dimensional stability to the activated carbon chemical adsorption assembly; and
   2. a plurality of weighted portions, each weighted portion being provided with at least one weight.

12. The activated carbon chemical adsorption assembly of claim 11, wherein the plurality of rigid buoyant supports and the plurality of weights are alternately connected in series by the activated carbon textile, but unconnected except by the activated carbon textile.

13. The activated carbon chemical adsorption assembly of claim 12, wherein at least one weighted portion is provided with a single rigid weight which provides dimensional stability to the sinking portion.

14. The activated carbon chemical adsorption assembly of claim 12, wherein at least one weighted portion is provided with a plurality of individual weights.

15. The activated carbon chemical adsorption assembly of claim 11, wherein the plurality of buoyant supports is rigidly connected by buoyant means providing a second dimension of dimensional stability to the activated carbon chemical adsorption assembly.

16. The activated carbon chemical adsorption assembly of claim 15, wherein at least one weighted portion is provided with a single rigid weight which provides dimensional stability to the weighted portion.

17. The activated carbon chemical adsorption assembly of claim 15, wherein at least one weighted portion is provided with a plurality of individual weights.

18. The activated carbon chemical adsorption assembly of claim 15, wherein the plurality of buoyant supports and weights are alternately connected in series by the activated carbon textile.

19. The activated carbon chemical adsorption assembly of claim 15, wherein the plurality of buoyant supports and weights are paired and connected to each other by individual portions of activated carbon textile, the individual portions of activated carbon textile being unconnected except by the buoyant means rigidly connecting the floating supports and providing dimensional stability to the activated carbon chemical adsorption assembly.

20. The activated carbon chemical adsorption assembly of claim 1, wherein the activated carbon textile is produced by a process comprising the steps of
1. heating an infusible cured phenol-formaldehyde novolac novoloid fiber in air from about room temperature up to an intermediate temperature in the range of from about 250°C to about 450°C at a rate of temperature rise of from about 50°C/hour to about 200°C/hour, and
2. further heating the fiber in a nonoxidizing atmosphere from said intermediate temperature to a final temperature in the range of from about 700°C to about 900°C at a rate of temperature rise of from about 50°C/hour to about 200°C/hour.

* * * * *